D. GILBERT.
Axle-Box.
No. 34,681.
Patented Mar. 18, 1862.
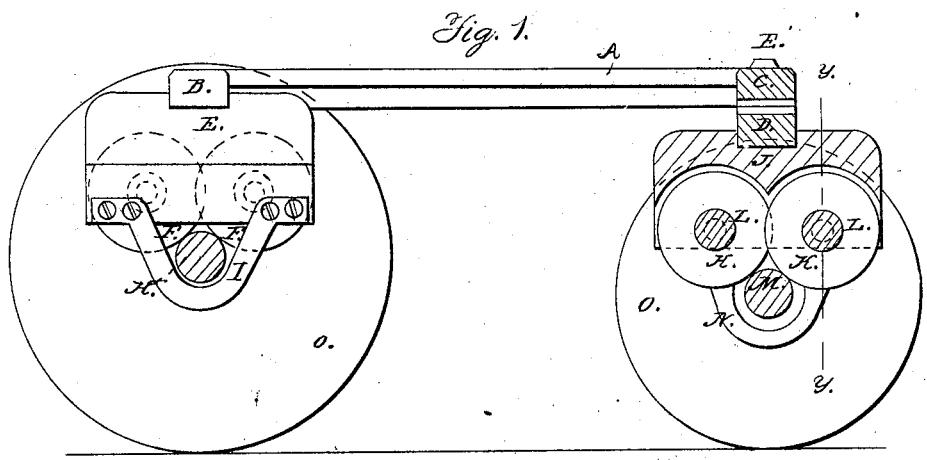
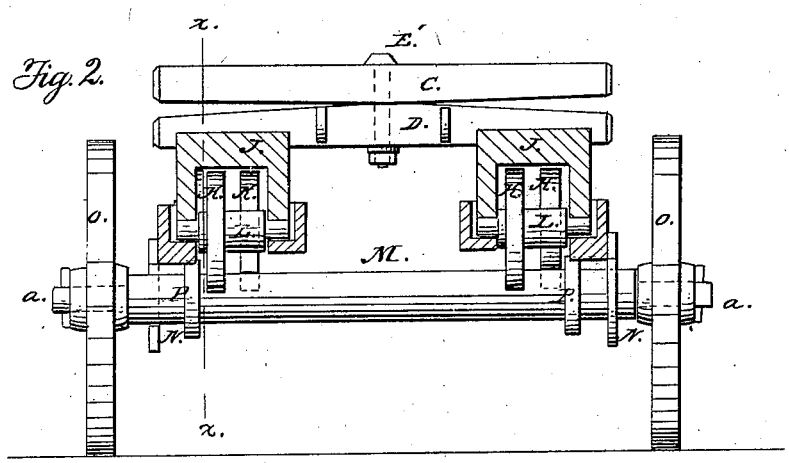

UNITED STATES PATENT OFFICE.

DANIEL GILBERT, OF MIDDLEFIELD, NEW YORK.

IMPROVEMENT IN WHEEL VEHICLES.

Specification forming part of Letters Patent No. 34,681, dated March 18, 1862.

*To all whom it may concern:*

Be it known that I, DANIEL GILBERT, of Middlefield, in the county of Otsego and State of New York, have invented a new and useful Improvement in Wheel Vehicles; and I do hereby declare that the following is a full, clear, and exact description of the same, reference being had to the accompanying drawings, making a part of this specification, in which—

Figure 1 is a side sectional view of my invention, taken in the line $x\,x$, Fig. 2; Fig. 2, a vertical section of the same, taken in the line $y\,y$, Fig. 1.

Similar letters of reference indicate corresponding parts in the two figures.

This invention consists in having the axles of the wheels fitted underneath friction-rollers attached to the bolsters of the vehicle so that the axles may rotate freely, and having the wheels fitted loosely on the arms of the axles, the parts being arranged substantially as hereinafter fully shown and described, whereby the axles and wheels are allowed to rotate independently of each other, and the draft of the vehicle thereby rendered extremely light, much less so than the draft of ordinary wheel-vehicles, especially in turning or passing around corners.

To enable those skilled in the art to fully understand and construct my invention, I will proceed to describe it.

A represents the bed of the body of a four-wheel vehicle.

B is the back and C the front bolster, which are permanently attached to the bed A, and D is a transom-bar, through the center of which and the front bolster C a king-bolt E' passes, the transom-bar being allowed to turn freely on the king-bolt, in the same way as the front axle of an ordinary vehicle turns on its king-bolt.

To the back bolster B there are permanently attached two boxes E E, one near each end, and in each of these boxes there are placed two friction-rollers F F on separate axes G G. The friction-rollers in each box are not in line with each other, and they overlap—that is to say, one projects past the other—so as to form a bearing-surface for the axle H, which is retained in proper position by hangers I I.

To each end of the transom-bar D there is attached a box J. These boxes J are precisely similar to the boxes E E, and each contains a pair of friction-rollers K K, placed on separate axes L, and arranged in the same way as the rollers F of the boxes E to serve as bearings for the front axle M, which is retained in proper position by hangers N. The draft-pole is attached to the transom-bar D.

The wheel O of the vehicle are placed loosely on arms $a$ of the axles H M in the same way as the wheels of an ordinary vehicle are placed on its axles, and each axle is provided with two bosses or circular flanges P P, which are at the outer sides of the outermost rollers F K, and serve to prevent any lateral movement of the axles.

From the above description it will be seen that as the vehicle is drawn along the axles H M the wheels O are allowed to rotate independently of each other. Hence it will be seen that less friction will be produced than by the old arrangement, as in the latter case the wheels O rotate at all times on the arms $a$ of the axles, whereas in my invention the axles H M are allowed to rotate under antifriction bearings, which much reduce the friction, and as the wheels are also allowed to turn on their axles one wheel may rotate faster than the other in turning corners, and the drag or slip, which would ensue in turning curves if the wheels were permanently attached to their axles is avoided.

It will be understood that in turning curves the wheels at one side of the car which describe or pass over the greatest space—the outer ones—rotate faster than the inner ones, and hence those vehicles which have axles that turn with the wheels attached permanently to them—as railroad-cars, for instance—have a great deal of friction attending their draft movement over curves, as the inner wheels must drag or the outer ones slip over the surface they pass. This difficulty is fully obviated by my invention.

I do not claim a wheeled vehicle provided with axles that rotate with wheels attached permanently to them; but I do claim as my invention and desire to secure by Letters Patent—

The rotating axles H M, with the friction-roller bearings F F G G, in combination with the wheels O, placed loosely on the arms $a$ of the axles, as and for the purpose set forth.

DANIEL GILBERT.

Witnesses:
BARNABAS M. GILBERT,
EGBERT MARKS.